United States Patent
Zentner et al.

(10) Patent No.: US 7,905,535 B2
(45) Date of Patent: Mar. 15, 2011

(54) FUEL FILLER DOOR UNIT

(75) Inventors: Christian Zentner, Wiesbaden (DE); Heiko Betzen, Röttingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/180,399

(22) Filed: Jul. 25, 2008

(65) Prior Publication Data
US 2009/0026794 A1    Jan. 29, 2009

(30) Foreign Application Priority Data

Jul. 28, 2007    (DE) .......................... 10 2007 035 491

(51) Int. Cl.
*B60K 15/05* (2006.01)
(52) U.S. Cl. .................................... 296/97.22
(58) Field of Classification Search ............... 296/97.22, 296/37.6
See application file for complete search history.

(56) References Cited

U.S. PATENT DOCUMENTS

| 5,520,431 | A | * | 5/1996 | Kapes et al. | 296/97.22 |
| 5,664,811 | A | * | 9/1997 | Martus et al. | 292/144 |
| 5,906,406 | A | * | 5/1999 | Pajakowski | 296/97.22 |
| 6,808,226 | B2 | * | 10/2004 | Hirano | 296/155 |

FOREIGN PATENT DOCUMENTS

| DE | 2059439 | A1 | | 6/1972 |
| DE | 19616315 | A1 | | 10/1997 |
| DE | 69802030 | T2 | | 7/2002 |
| DE | 2004-0055544 | | * | 1/2004 |
| DE | 202004005554 | U1 | | 7/2004 |
| EP | 0736406 | A1 | | 10/1996 |
| EP | 1362733 | A1 | | 11/2003 |
| EP | 1571029 | A2 | | 9/2005 |

OTHER PUBLICATIONS

German Patent Office, German Search Report for German Application No. DE 102007035491.8, Oct. 12, 2007.

* cited by examiner

*Primary Examiner* — Glenn Dayoan
*Assistant Examiner* — Pinel E Romain
(74) *Attorney, Agent, or Firm* — Ingrassia Fisher & Lorenz, P.C.

(57) ABSTRACT

A fuel filler door unit for a motor vehicle is provided that includes, but is not limited to a hinged arm embodied for mounting a fuel filler door, which is supported about a pivot axis so as to be pivotable, a locking section moved together with the fuel filler door and a locking element, which can be moved for locking and unlocking the fuel filler door by means of a control unit between a locking position, in which the locking element engages with the locking section, and a release position, in which the locking element does not engage with the locking section. The locking element and/or the locking section comprise a beveled surface, which is arranged in such a manner that the locking element and the locking section glide along one another in response to a closing motion of the fuel filler door during a state, in which the locking element is in the locking position.

12 Claims, 3 Drawing Sheets

US 7,905,535 B2

FUEL FILLER DOOR UNIT

CROSS-REFERENCE TO RELATED APPLICATION

This application claims priority to German Patent Application No. 102007035491.8, filed Jul. 28, 2007, which is incorporated herein by reference in its entirety.

TECHNICAL FIELD

The invention relates to a fuel filler door unit for a motor vehicle that includes, but is not limited to a hinged arm for mounting a fuel filler door that is supported about a pivot axis so as to be pivotable, a locking section moved together with the fuel filler door, and a locking element that can be moved for locking and unlocking the fuel filler door with a control unit between a locking position, in which the locking element engages with the locking section, and a release position, in which the locking element does not engage with the locking section.

BACKGROUND

Fuel filler doors serve the purpose of covering the opening in the car body, in which the tank filler neck is located and can be closed by means of a tank cap. Known fuel filler door arrangements encompass a fuel filler door, which can be swung open. For locking the fuel filler door in the closed state, provision can be made on the fuel filler door and on a hinged arm, respectively, for a locking section to which the fuel filler door is fastened. The locking section projects inwards from the fuel filler door. In the closed state of the fuel filler door, a locking element, which is embodied as a locking rod, can engage with an opening in this locking section. An actuator can move the locking element into a locking position, in which it engages with the opening of the locking section. The actuator can be activated by means of the central locking system of the vehicle, for example. For the purpose of opening or closing the fuel filler door, the actuator moves the locking rod into a release position, in which the locking rod does not engage with the locking section. Such a fuel filler door is described in EP 0 736 406 B1.

It is at least one object to provide a fuel filler door unit that enables a closing of the fuel filler door independent of the locking state. In addition, other objects, desirable features, and characteristics will become apparent from the subsequent summary and detailed description and the appended claims, taken in conjunction with the accompanying drawings and this background.

SUMMARY

The at least one object, other objects, desirable features, and characteristics is solved with a fuel filler door unit, that includes, but is not limited to a hinged arm adapted to mount a fuel filler door and supported about a pivot axis so as to be pivotable. The fuel filler door unit also includes, but is not limited to a locking section moved together with the fuel filler door and a locking element that can be moved for locking and unlocking the fuel filler door under the control of a control unit between a locking position, in which the locking element engages with the locking section, and a release position, in which the locking element does not engage with the locking section. The locking element encompasses a beveled element surface that is arranged in such a manner that the locking section strikes the beveled element surface in response to a closing motion of the fuel filler door during a state in which the locking element is in the locking position and/or the locking section encompasses a beveled section surface that is arranged in such a manner that it strikes the locking element in response to a closing motion of the fuel filler door during a state in which the locking element is in the locking position. The beveled surface is arranged in such a manner and the beveled surfaces are arranged in such a manner, respectively, that the locking element and the locking section glide along one another in response to a closing motion of the fuel filler door during a state in which the locking element is in the locking position.

In the fuel filler door unit according to an embodiment, the locking element and/or the locking section encompasses a beveled surface. In an embodiment, in which the locking element encompasses a beveled surface, it is arranged in such a manner that the locking section moved by means of the fuel filler door strikes the beveled surface in response to a closing motion of the fuel filler door during a state, in which the locking element is in the locking position. In an embodiment in which the locking section encompasses a beveled surface, the beveled surface is arranged in such a manner that is strikes the locking element in response to a closing motion of the fuel filler door during a state, in which the locking element is in the locking position. In both cases, the beveled surface is embodied in such a manner that the locking element and the locking section glide along one another in response to a closing motion of the fuel filler door during a state in which the locking element is in the locking position.

If the locking element is in the locking position, even though the fuel filler door is not closed, that is, for example, when the central locking system was actuated after refueling, even though the fuel filler door was not closed previously, the fuel filler door can still be closed subsequently. In response to the closing motion of the fuel filler door, the beveled surface provided at the locking section then strikes the locking element and the locking section strikes the beveled surface provided on the locking element, respectively, so that the locking element and the locking section glide along one another via the beveled surface and the beveled surfaces, respectively.

A further advantage of the embodiment is that it is not important during the assembly to make sure whether or not the locking element is in the locking position at that moment. The beveled surface and the beveled surfaces, respectively, ensure that the locking element cannot break off during the assembly of the fuel filler door and of the hinged arm, respectively, when the locking section strikes the locking element, which, if applicable, is located in the locking position, during an assembly step.

Generally, the gliding motion of the locking element and of the locking section along one another is possible if one of these elements encompasses a beveled surface. A particularly secure and smooth gliding motion is attained when the locking element as well as the locking section encompasses a beveled surface.

To enable the gliding motion, the locking element or the locking section can be supported so as to be resilient, for example. In a simple and cost-efficient embodiment, either the locking section or the locking element is sufficiently elastic, at least in sections so as to enable an evasion during the gliding motion. For example, the locking element can be embodied to be elastic at least in sections in such a manner that it has the capability to evade the locking section without additional spring element in response to the gliding motion.

In a particularly advantageous embodiment, the control unit is embodied in such a manner that the locking element can be moved into the release position in response to the gliding motion between locking element and locking section. If the control unit comprises an electric motor, for example, the locking element together with the movable parts of the electric motor is thus moved into a position of the unlocked state. The fuel filler door can then be closed. A renewed locking of the system takes place again only in response to a renewed actuation of the central locking system, for example. Such an embodiment is advantageous in view of the stability and the capability to accurately guide the locking element. Due to the fact that the vehicle is generally opened after closing the fuel filler door so as to leave the gas station, a locking of the fuel filler door is normally not necessary after closing it after refueling because the locking element typically assumes the release position in response to the actuation of the central locking system for the purpose of opening the motor vehicle. Preferably, the locking element is made of plastic for a cost-efficient production.

A preferred embodiment provides for the locking element to be embodied in a hook-shaped manner, in particular in a J-shaped manner. Due to the hook-shaped embodiment, the locking element can be provided on the outer contour of the fuel filler door unit in an extremely space-saving manner. In particular, the locking element can comprise an elongate base section engaging with the control unit, an adjacent center section running at an incline or at right angles, respectively, as compared to the base section and an adjacent end section, which is embodied for engaging with the locking section, at which provision is made for the beveled surface in the corresponding embodiment. Preferably, the end section of the locking element can run substantially parallel and in particular opposite to the base section. This ensures that the end section also performs a corresponding axial displacement, which is offset in parallel in response to an axial displacement of the locking element between the release position and the locking positions through the control unit.

According to a further advantageous embodiment, the base section and the end section are arranged so as to be substantially horizontal in an installed fuel filler door unit. An axial displacement of the locking element thus also corresponds to a substantially horizontal displacement.

Preferably, the base section and the end section are arranged so as to be offset to one another in vertical and horizontal direction in an installed fuel filler door unit. The center section can thereby be embodied so as to run in a curved manner or at an incline to the closed fuel filler door.

A compact construction can be achieved when the direction of motion of the locking element between the release position and the locking position runs substantially at right angles to the pivot axis of the fuel filler door and/or parallel to the longitudinal axis of the hinged arm.

Provision is made for corresponding engagement elements so as to enable the locking element to engage with the locking section. More preferably, the locking section encompasses an attachment piece pointing in the direction of the tank opening at the hinged arm or at the fuel filler door comprising an opening, with which the locking element can engage in the locking position when the fuel filler door is closed.

The fuel filler door unit can encompass a cavity body, on which the hinged arm is pivotally fastened, and the control unit for moving the locking element can be provided at the outside of the cavity body in the region of the pivot axis. Such an embodiment is highly compact and can be installed easily. It is thereby particularly simple when the locking element encompasses the cavity body.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
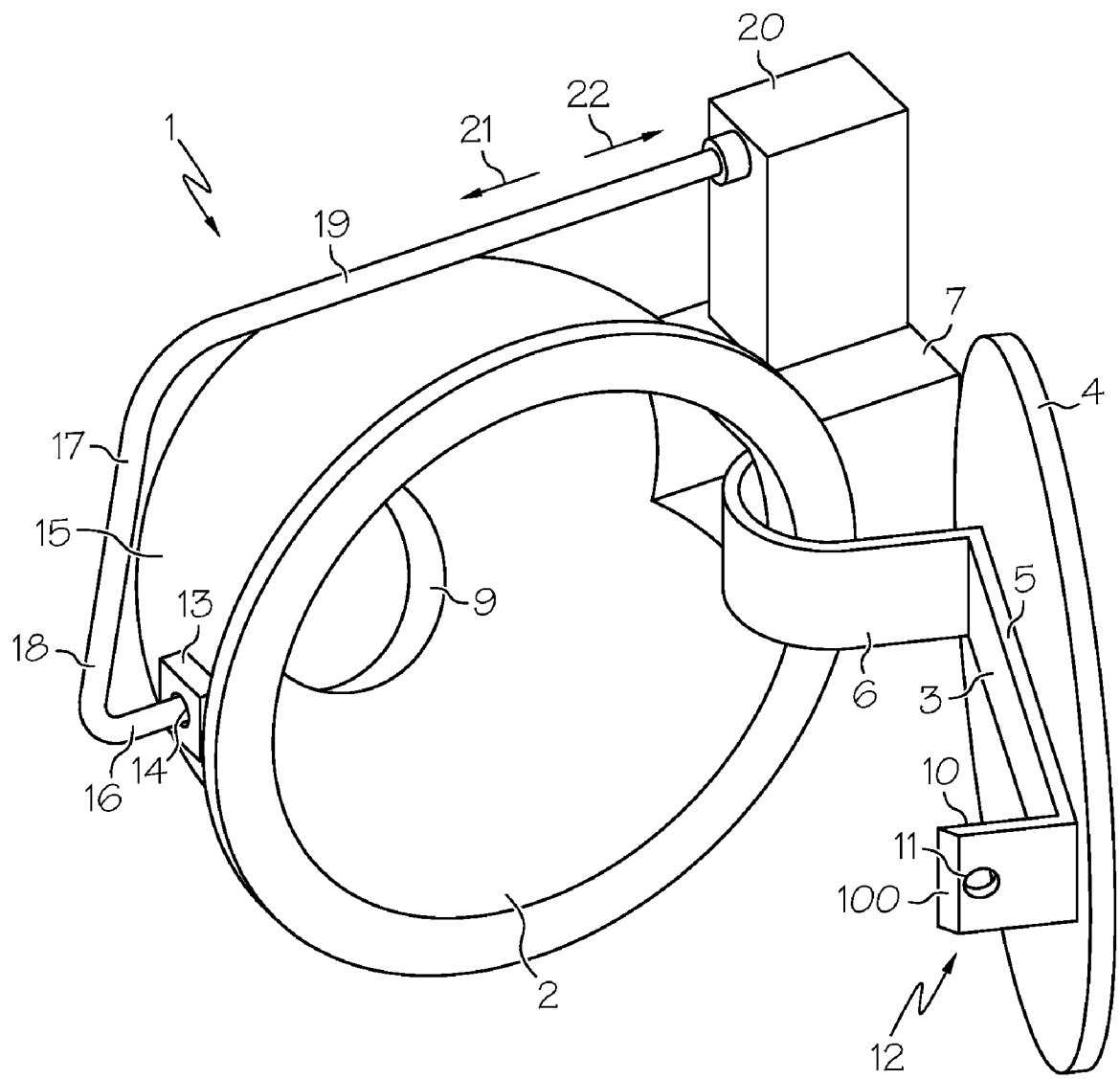
FIG. 1 shows a perspective illustration of a fuel filler door unit according to an embodiment.

FIG. 1 shows the fuel filler door unit 1, which comprises a cavity body 2 and a hinged arm 3, which is supported on the cavity body 2 so as to be capable of being pivoted and on which a fuel filler door 4, which is illustrated herein so as to be open, is fastened. The hinged arm 3 comprises an elongate section 5, which is embodied for mounting the fuel filler door 4 as well as an adjacent curved section 6, which projects into a housing extension 7, which is embodied on the side of the cavity body 2 and which is supported therein so as to be capable of being pivoted about a pivot axis 8 (see FIG. 2). Provision is made in the rear region of the cavity body 2 for an opening 9, which serves the purpose of accommodating a non-illustrated fuel filler neck.

In the region of the free end of the hinged arm 3, an attachment piece 10 comprising an opening or a bore 11 is embodied, which together form a locking section 12. At the front face facing away from the fuel filler door 4, the attachment piece 10 encompasses a beveled section surface 100. Approximately opposite to the housing extension 7, provision is made on the cavity body 2 for a guide element 13 comprising a guide opening 14, which penetrates the wall 15 of the cavity body 2. The end section 16 of a hook-shaped locking element 17 made of plastic, which is embodied as locking pivot, is guided in the guide opening 14. A center section 18 follows the end section 16 of the locking element 17 and a base section 19 of the locking element 17, which is in operatively connected to a control unit 20 arranged on the upper side of the housing extension 7, follows the center section 18. The locking element 17 can be moved towards the control unit in axial direction, that is, along the arrow 22, as well as away from the control unit 20 along an arrow 21 by means of the control unit 20, which can be embodied as an actuator or as an electromagnet.

Figure 2:
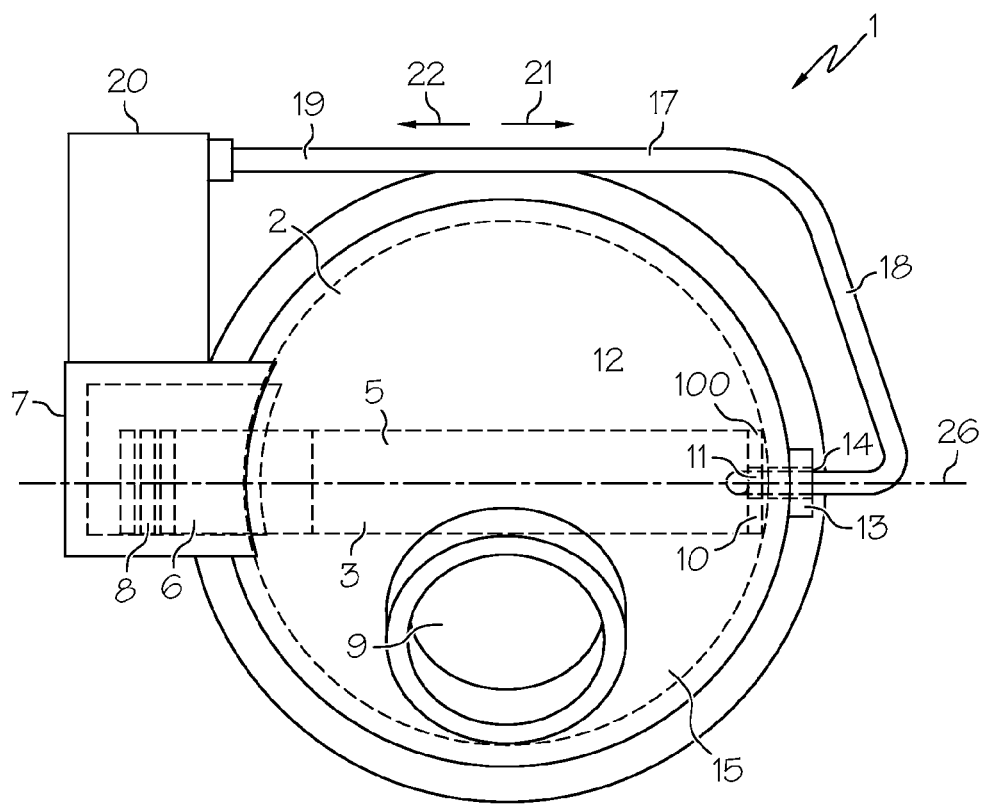
FIG. 2 shows a rear view of the fuel filler door unit according to FIG. 1.

FIG. 2 shows the fuel filler door unit 1 in a rear view with a closed fuel filler door 4. The line of vision is from the rear onto the cavity body 2 so that the locking element 17 is visible. The hinged arm 3 is covered by the cavity body 2 and is thus illustrated in a dashed manner. For orientation purposes, the longitudinal axis 26 of the hinged arm is depicted. FIG. 2, which is also covered by the cavity body and illustrated in a dashed manner, shows the pivot axis 8 about which the hinged arm 3 can be pivoted. In the closed and locked state of the fuel filler door 4 as illustrated in FIG. 2, the end section 16 of the locking element 17 engages with the hinged arm 3 through the bore 11 of the attachment piece 10.

Figure 3:
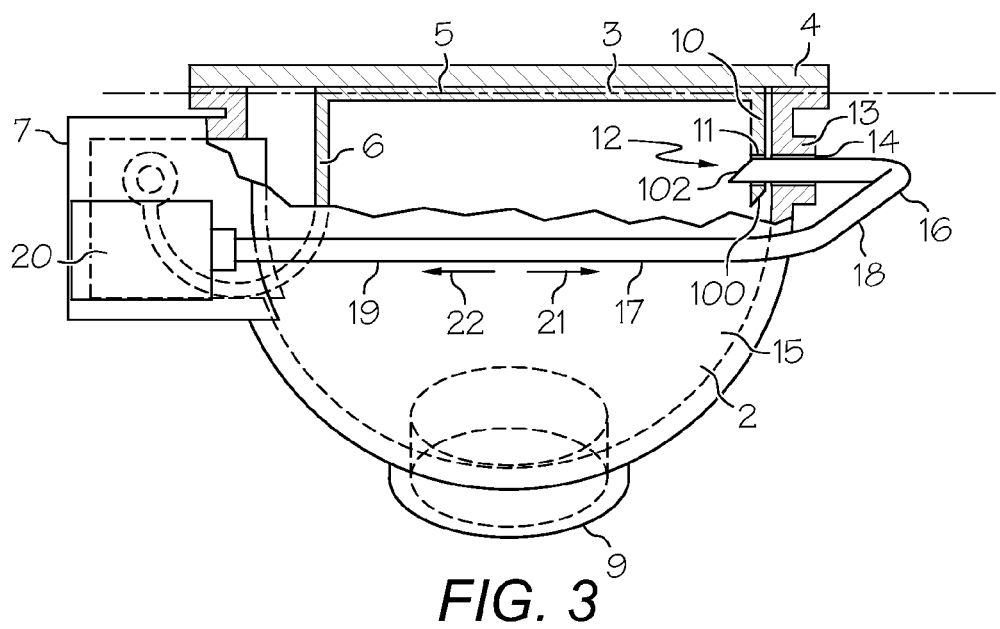
FIG. 3 shows a partially ripped open top view onto the fuel filler door unit according to FIG. 1.

FIG. 3 shows a top view from the top onto the fuel filler door unit 1 (according to the field of view III, as is specified in FIG. 2) in a partially ripped open view. The fuel filler door 4 is also illustrated herein so as to be closed and locked. It can be seen in this view how the end section 16 of the locking element 17 engages through the bore 11 of the attachment piece 10 of the hinged arm 3. The beveled element surface 102 is visible at the end of the end section 16.

It can furthermore be seen well in this view that the guide element 13 is positioned with the guide opening 14 in such a manner that, when the fuel filler door 4 is closed, the guide opening 14 is aligned with the bore 11 of the locking section 12 so that the end section 16 of the locking element 17 embodied as a locking pivot can engage with the bore 11 of the locking section 12 and leaves the bore 11 of the locking section 12 in a direction according to arrow 21 of the locking pivot in response to a displacement of the hook-shaped locking element 17.

Figure 4:
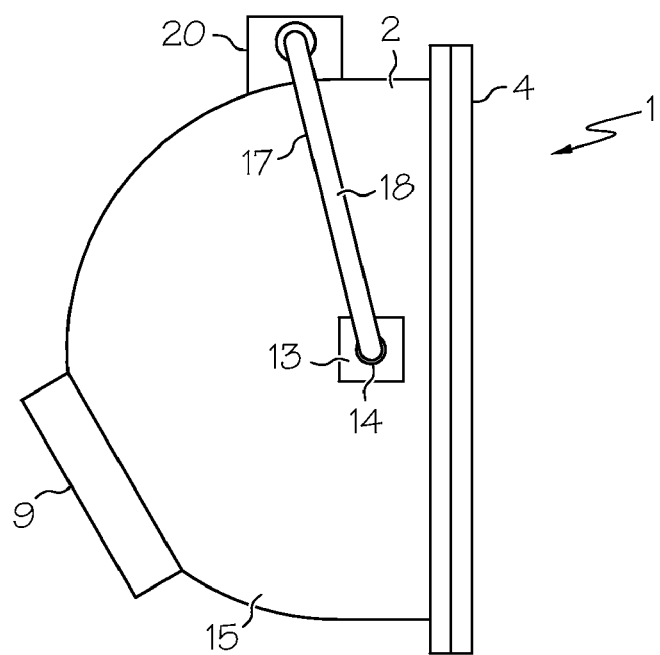
FIG. 4 shows a side view of the fuel filler door unit of FIG. 1.

FIG. 4 shows a lateral top view onto the fuel filler door unit 1 comprising a closed fuel filler door 4 according to the field of view IV, as is specified in FIG. 3. In particular, the inclined arrangement of the center section 18 of the locking element 17 becomes clear herein.

Figure 5:
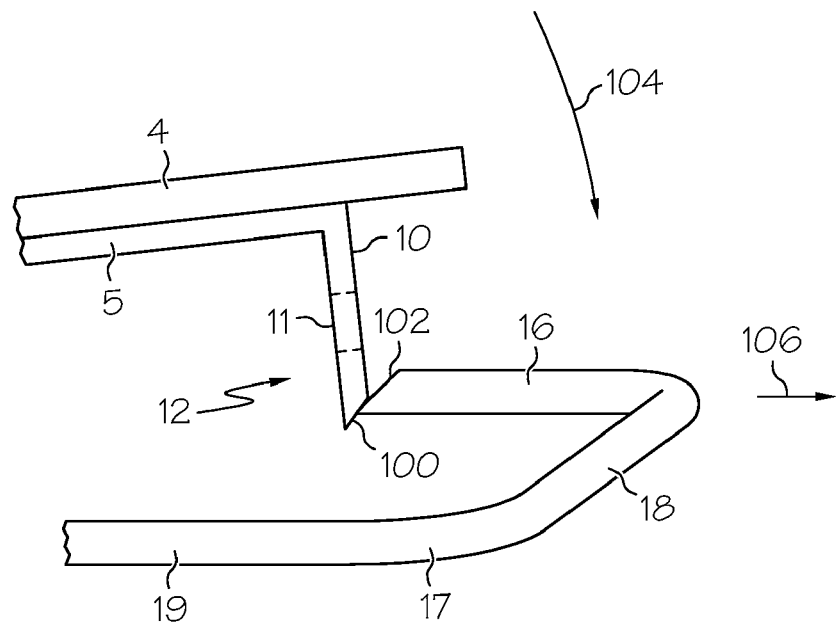
FIG. 5 shows a detail of the fuel filler door unit of FIG. 1 in response to a closing motion.

FIG. 5 shows a detail of the fuel filler door unit to clarify the interaction of the locking element 17 with the locking section 12 during a closing motion of the fuel filler door 4 in the direction of the arrow 104, namely when the locking element 17 is in the locking position. It can be seen in particular how the locking element 17 gives way by the gliding of the beveled section surface 100 of the locking section 12 and of the beveled element surface 102 of the locking element 17 along one another in the direction of the arrow 106.

As can be seen in particular from FIGS. 1 to 4, the locking element 17 encompasses the cavity body 2 in its rearward upper location because of its hook-shaped embodiment, and the hook-shaped embodiment ensures that a displacement of the base section 19 of the locking element is converted into a displacement of the end section 16, which corresponds thereto.

It can further be seen from FIGS. 2 to 4 that the center section 18 of the locking element 17 extends forward at an incline from the base section 19 running substantially horizontally and, at the same time, forward from the outside to the end section 16, which, in turn, projects substantially horizontally through the guide opening 14 into the interior of the cavity body. This embodiment of the locking element 17, which encompasses the cavity body 2 in partial regions, makes it possible for the control unit 20 to be preassembled at the upper or lower side of the housing extension 7 in a space-saving manner and that a locking of the fuel filler door 4 in the region of its end facing away from the pivot axis 8 is possible. Due to the encompassing embodiment of the locking element 17, the outer dimension of the fuel filler door unit 1 is barely increased. The fuel filler door unit 1 can be produced together with the control unit 20 and the locking element 17 as a preassembled component, and the arrangement of the control unit 20 directly on the housing extension 7 ensures that the fuel filler door unit 1 can easily be inserted into the car body from the outside through a corresponding accommodation opening. Due to the fact that the housing extension 7 together with the control unit 20 is arranged on one side of the fuel filler door unit 1, this laterally projecting unit can initially be inserted into the accommodation opening when the fuel filler door unit 1 is inclined and can subsequently be positioned laterally next to the accommodation opening behind the car body sheet by tilting the fuel filler door unit 1. The cavity body 2 can thus be completely inserted into the accommodating opening and can be fastened therein.

The fuel filler door unit according to an embodiment works as follows. Assumed is, for example, a state, in which the fuel filler door 4 is closed and locked, that is, in particular the end section 16 of the locking element 17 grips through the bore 11 of the locking section 12 and an opening of the fuel filler door 4 about the pivot axis 8 is not possible. Actuating the central locking system, for example, prompts the control unit 20 to move the locking element 17 in the direction of the arrow 21. The end section 16 of the locking element 17 is thus moved out of the bore 11 of the locking section 12 so that the locking section 12 is free. An opening of the fuel filler door 4 is thus possible. After carrying out a refueling, for example, the fuel filler door 4 is again closed about the pivot axis 8. The actuation of the central locking system, for example, can then prompt the control unit 20 to retract the locking element 17 in the arrow direction 22, whereby the end section 16 of the locking element 17 in particular also moves through the bore 11 of the locking section 12 and locks the fuel filler door 4. An opening of the fuel filler door 4 is thus no longer possible. The entry of the end section 16 of the locking element 17 into the bore 11 of the locking section 12 is thereby facilitated by means of the beveled element surface 102 of the locking element 17.

However, it may happen, for example, that the driver of the fueled vehicle actuates the control unit 20 for closing, even though the fuel filler door 4 is not yet closed. Nonetheless, it is possible with the fuel filler door unit 1 to subsequently close the fuel filler door 4 without having to one again actuate the central locking system.

The fuel filler door 4 is thereby moved in the direction of the arrow 104 (see FIG. 5). The beveled section surface 100 of the locking section 12 strikes the beveled element surface 102 of the end section 16 of the locking element 17. Due to the fact that the beveled section surfaces 100, 102 meeting one another are beveled, the locking element 17 is pushed in the direction of the arrow 106 so that the end section 16 evades the locking section 12. The movable parts of the control unit 20, which is embodied as an actuator or as an electromagnet, for example, thus move together with the locking element 17.

Even though the locking element 17 is already in the locking position, the fuel filler door 4 can thus be closed without having to once again actuate the control unit 20, for example by means of the central locking system.

After the fuel filler door has been closed in this manner, the locking element 17 in this embodiment is no longer in the locking position. Generally, this is also not necessary, because the driver will actuate the central locking system anyways to open for the purpose of getting into the motor vehicle, so as to open the closed motor vehicle door. In response to the actuation of the central locking system to open, the locking element 17 would anyways be moved into the release position, in which the end section 16 would not engage with the bore 11 in the locking section 12. In this state, the fuel filler door 4 is held by means of inherently known latch or catch mechanisms without a locking being present, according to a state, which in a normal case is present in response to a closed fuel filler door, when the central locking system is not locked.

In another embodiment, the locking element can be embodied so as to be sufficiently elastic or can be supported to enable the gliding motion of the beveled section surfaces 100, 102.

In response to the installation of the fuel filler door unit 1, the embodiment comprising beveled surfaces at the locking section 12 and/or at the end section 16 of the locking element 17 proves to be advantageous.

It is not necessarily possible to electrically actuate the control unit 20 during the installation. However, to make the installation as simple as possible, the locking element 17 should, if possible, be in the space-saving locking position so as to facilitate a simple insertion into the car body. So as to optimally place the opening 9 in the cavity body 2 around the fuel filler neck, for example, it is advantageous, and however, when the fuel filler door 4 can also be open during the installation. Without beveled surfaces on the locking section 12 and on the end section 16, respectively, of the locking element 17, a closing of the fuel filler door after the installation would then only be possible again when the control unit 20 can also be actuated so as to move the locking element 17 out of the locking position. The embodiment makes it possible, however, to close the fuel filler door 4 after the installation of the fuel filler door unit 1 as described, even if the locking element 17 is in the space-saving locking position, without having to actuate the control unit 20. The installation of the fuel filler door unit 1 is thus facilitated significantly. It is furthermore ensured that during the installation, during which forces must generally be expended, the locking element 17 can be prevented from breaking off, when, for example, the fuel filler door 4 is closed inadvertently, even though the locking element 17 is in the locking position.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fuel filler door unit for a motor vehicle, comprising
   a hinged arm adapted for mounting a fuel filler door and supported about a pivot axis so as to be pivotable;
   a locking section movable with the fuel filler door;
   a locking element adapted to be moved for locking and unlocking the fuel filler door; and
   a control unit adapted to control the locking element between a locking position, in which the locking element engages with the locking section, and a release position, in which the locking element does not engage with the locking section,
   wherein the locking element encompasses a beveled element surface that is arranged in such a manner that the locking section strikes the beveled element surface in response to a closing motion of the fuel filler door during a state, and
   wherein, during the state, the beveled element surface is arranged such that the locking element and the locking section glide along one another in response to a closing motion of the fuel filler door and the locking element deforms elastically until engaging the locking section; and
   wherein the locking element is substantially rigid and comprises an elongate base section engaging with the control unit, an adjacent center section having a position of at least one of an incline and at right angles as compared to a base section, and an adjacent end section that is embodied for engaging with the locking section.

2. The fuel filler door unit according to claim 1, wherein the control unit is adapted to respond to a closing motion of the fuel filler door during the state and allows for a motion caused by a gliding motion between locking element and locking section of the locking element into the release position.

3. The fuel filler door unit according to claim 1, wherein the locking element is made of plastic.

4. The fuel filler door unit according to claim 1, wherein the locking element is a hook-shaped locking element.

5. The fuel filler door unit according to claim 4, wherein the hook-shaped is a J-shaped.

6. The fuel filler door unit according to claim 1, wherein the adjacent end section of the locking element runs substantially parallel and opposite to the base section.

7. The fuel filler door unit according to claim 1, wherein the base section and the adjacent end section when installed are substantially horizontal.

8. The fuel filler door unit according to claim 6, wherein the base section and the end section when installed are arranged offset to one another in a vertical and a horizontal direction.

9. The fuel filler door unit according to claim 1, wherein the locking section encompasses an attachment piece pointing in a direction of a fuel tank opening.

10. The fuel filler door unit according to claim 1, wherein the hinged arm is fastened to a cavity body so as to be pivotable.

11. The fuel filler door unit according to claim 9, wherein the control unit is arranged on an outside of the cavity body in a region of the pivot axis.

12. The fuel filler door unit according to claim 10, wherein the locking element at least partially encompasses the cavity body.

* * * * *